May 2, 1961 T. L. MOODY 2,982,431
AUTOMOBILE CAMPERS' KIT
Filed Nov. 20, 1958 4 Sheets-Sheet 1

INVENTOR.
THOMAS L. MOODY
BY Robertson and Voutie
ATTORNEYS.

INVENTOR.
THOMAS L. MOODY
BY Robertson and Youtie
ATTORNEYS.

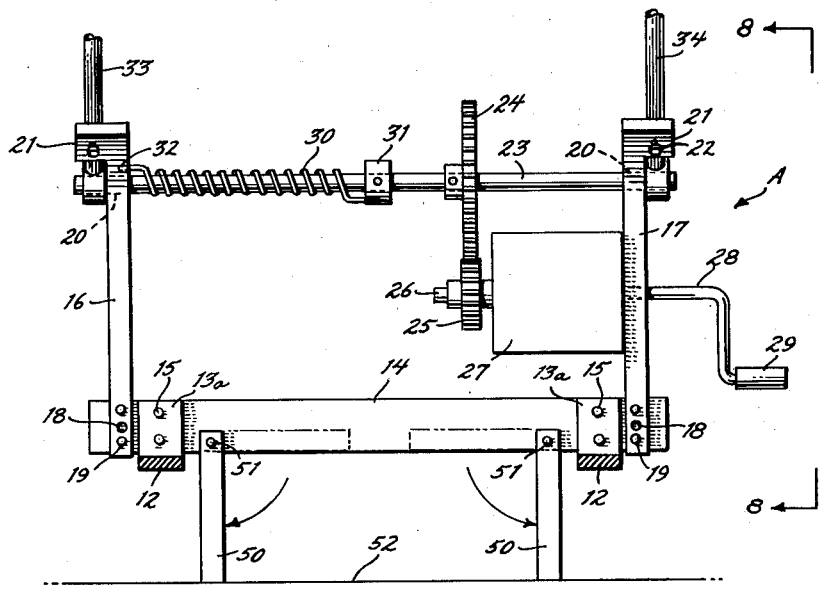
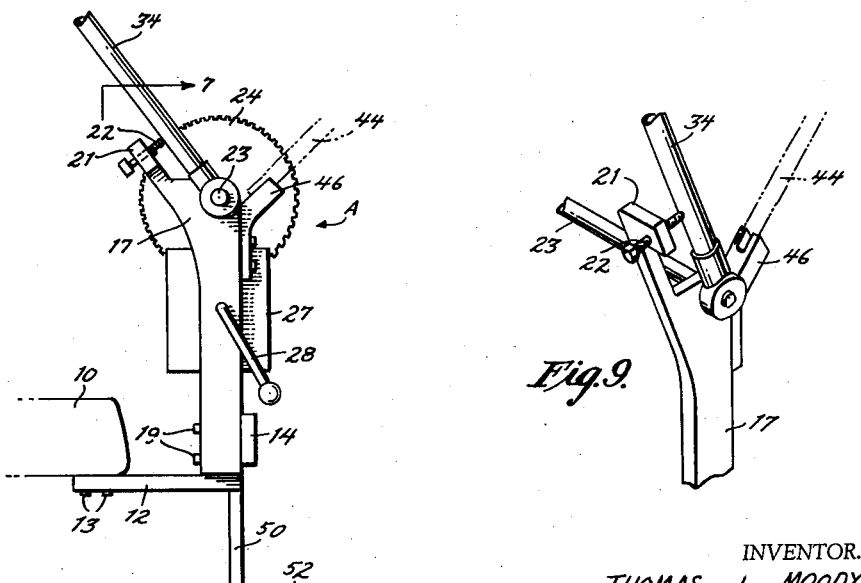

May 2, 1961        T. L. MOODY        2,982,431
AUTOMOBILE CAMPERS' KIT
Filed Nov. 20, 1958        4 Sheets-Sheet 4
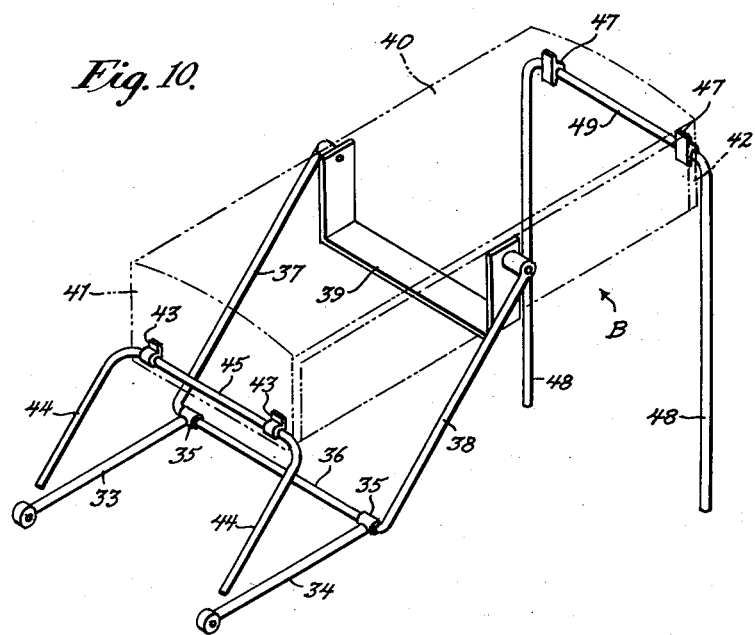
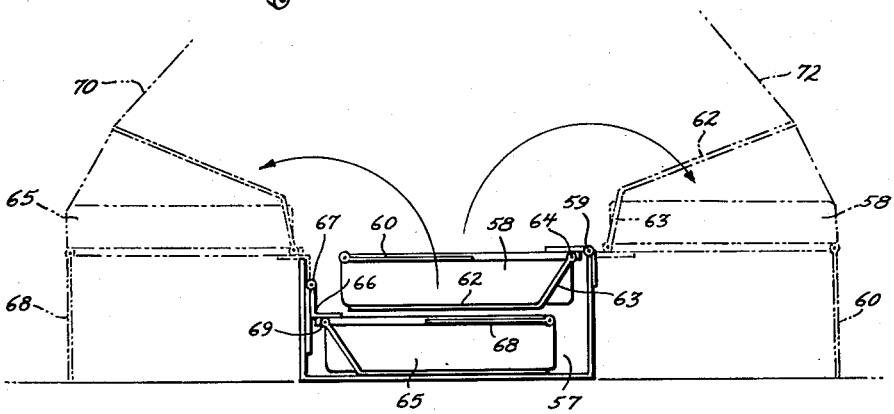
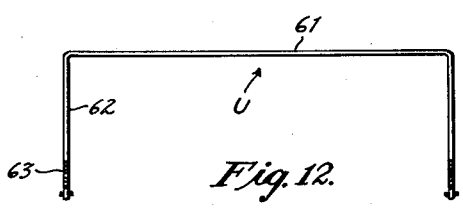
INVENTOR.
THOMAS L. MOODY
BY Robertson and Youtie
ATTORNEYS.

United States Patent Office 2,982,431
Patented May 2, 1961

2,982,431
AUTOMOBILE CAMPERS' KIT
Thomas L. Moody, 348 Warren Road, Hatboro, Pa.

Filed Nov. 20, 1958, Ser. No. 775,142

9 Claims. (Cl. 214—450)

The present invention relates to a campers' kit intended for mounting on an automobile and is concerned primarily with such a kit that is supported from the chassis of the car in a novel manner and which has approved qualities of assembly and disassembly.

At the present time, the vacation-minded American public is becoming more and more adapted to the use of camping equipment that is carried by and/or mounted on an automobile. Many types of campers' kits are now available; yet it is believed that all of the known equipment is open to either one or both of two objections.

In the first instance, the now-known camping equipment is either stowed away in its compact nonusable condition either on a trailer or in a bundle or package that is mounted on the top of a car body and supported therefrom. The use of trailers is unsuitable to many people and is highly expensive. The practice of mounting the equipment on the top of a car body generally requires a permanent installation of some type on the roof, and many automobiles, such as hardtops and convertibles, are not adapted to this practice. Then again, the now-known equipment is characterized by complexity of operation and difficulty in converting the equipment from its stored away compact condition into a usable state in which it is erected to provide a tent or similar enclosure for sleeping quarters.

With the foregoing conditions in mind, the present invention has in view as a highly important object the provision of a campers' kit that includes mechanism whereby it is supported from the rear end of a car chassis rather than from the roof or other part of the car body. When the kit is in its compact nonusable condition, it is literally suspended over the car body and may be connected thereto by a tie-down device. However, the car body never supports or takes the weight of the kit.

More in detail, the invention has as an object the provision of a campers' kit which includes as a characteristic and essential element an attachment that is connected to the chassis of the car at the rear bumper and which attachment includes a pair of pivotally mounted arms that are spaced apart a distance proportionate to the width of the automobile on which the attachment is mounted. Carried by and suspended from the upper ends of these arms and therebetween is a kit body which houses the sleeping equipment, side flaps, and end walls of a sleeping enclosure in a compact, folded-up state. Supported from this kit body but separate therefrom is a canopy which provides the roof of the sleeping enclosure.

When the kit is packed away for nonuse during transportation, the kit body, together with the canopy, is disposed over the body of the motor vehicle and its forward end tied down to the roof. When an appropriate camp site has been reached, the tie-down is released, and any temporary bonds between the canopy and the kit body broken. Mechanism associated with the pivotal mounting of the arms aforesaid is now operated to swing the arms upwardly and rearwardly, which movement, of course, moves the kit body and canopy. When a position is reached at which the canopy is at a proper predetermined height from the ground, a pair of rear supporting legs, the upper ends of which are attached to the canopy, are swung downwardly to a position in which their lower ends engage the ground surface. At the same time, a pair of shorter forward supporting legs are moved into supporting relation with respect to the car body. Thus the canopy is supported from its front and rear ends at a proper height. Continued rotation of the shaft carrying the arms causes the latter to move the kit body downwardly, during which movement it is separated from the canopy. During this action, side flaps, which have their upper ends secured to the canopy and their lower ends to elements of the kit body, are unfolded, and the action is continued until the kit body reaches the ground, on which it is supported. At this point, bed elements, which are included in the kit body and to which the lower ends of the side flaps are secured, are folded outwardly.

It is evident that it is desirable to have the rear end of the car at a fixed position relative to the ground when the kit is erected into usable position. Thus, another somewhat more detailed object of the invention is to provide, in a campers' kit of the character aforesaid, an attachment that is connected to the rear end of a car chassis and which attachment includes a pair of pivotally mounted legs that are adapted to be swung down into supporting engagement with the ground when the kit is erected. During periods of transportation these legs are swung upwardly and held in their upraised position.

It is evident that if a campers' kit of the character aforesaid is to meet with acceptance, certain standard sizes must be susceptible of application to cars of different types and makes within certain ranges. Moreover, it is of the utmost importance that the weight of the kit always be supported from the attachment at the rear end rather than the car body. Thus another somewhat more detailed object is to provide, in a campers' kit of the type noted, an attachment of the character indicated which includes adjustable stops or abutments for the arms aforesaid which support the kit. By properly adjusting these abutments, definite assurance may be had that the weight of the kit is always taken by the attachment.

To the end of providing an arrangement whereby a substantially uniform force is required to operate the shaft on which the arms are mounted, either in erecting the kit or restoring it to its compact condition over the car, a further object is to provide, in an attachment of the type noted, a shaft carrying the arms with which is associated a spring which, in effect, counterbalances the weight of the kit. Moreover it is desirable that the shaft and arms carried thereby remain in any adjusted position without the use of locks or anchoring devices. Thus another object is to provide, in an attachment of the type indicated, mechanism for operating the shaft which includes a gear-reduction unit and which unit also serves as a lock for maintaining the shaft in an adjusted position.

In accordance with the present invention, the kit provided thereby is intended to provide sleeping quarters for two or more people. Moreover, it is evident that the width of the kit is limited by the width of the car on which it is mounted. Thus, another object in view is to provide, in a campers' kit of the character indicated, a kit body having a width substantially equal to that of a car body, and which body is formed with a central well or recess in which is pivotally mounted two bed elements which assume an overlapping relation in the nonusable position. After the kit body reaches the ground by the operation above described, these bed elements are swung outwardly into usable position and the lower ends of the side flaps, which are secured to the bed elements, assume their effective position. Another somewhat more detailed object of the invention is to provide a U-shaped frame that is associated with each bed element and which is pivotally mounted thereon. This frame serves a dual function. When the kit is erected, the frame is swung into a position in which the back thereof engages the adjacent side flap to maintain the latter distended so as to provide adequate space over that particular bed element. When the kit is to be stored away into its compact state, these frames are swung downwardly to maintain the various components of each bed element in a compact condition.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a campers' kit consisting essentially of an attachment that is secured to the rear end of a car chassis and which attachment includes a rotary cross shaft carrying a pair of arms from the upper free ends of which is suspended a kit body, together with a canopy that is supported from the kit body, front and rear supports for the canopy, and mechanism for rotating the shaft, together with other details necessary to provide an operative structure.

For a full and more complete understanding of the invention, reference may be had to the following description and accompanying drawings, wherein:

Figure 7 is a detailed view, mostly in elevation, looking to the rear of the attachment which is mounted on the car chassis, and mechanism associated therewith;

Figure 8 is a side view, taken normal to the showing of Figure 7, of the attachment and associated mechanism;

Figure 9 is a detailed perspective of one of the adjustable abutments for the side arms;

Figure 10 is a perspective view of the side arms from which the kit body is suspended and the supporting members for the canopy with the canopy and kit body being shown in phantom outline;

Figure 11 is a detailed view in rear elevation showing the bed elements and U-shaped frames associated therewith in their compact condition and depicting in broken lines their extended or usable condition, intended to accommodate more than two people; and Figure 12 is a detail of one of the U-shaped frames.

Figure 1:
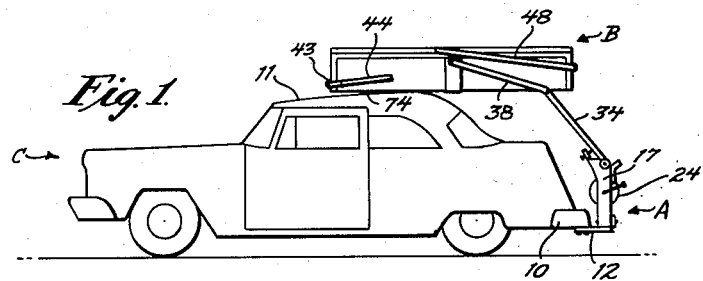
Figure 1 is a view in side elevation depicting the campers' kit of this invention as applied to a car body in condition for transportation.
Figure 2:
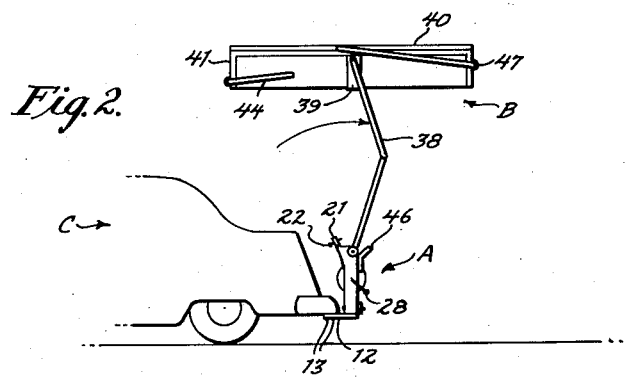
Figure 2 is a view similar to Figure 1, showing only the rear end of the car and illustrating one step of the operation for erecting the kit.
Figure 3:
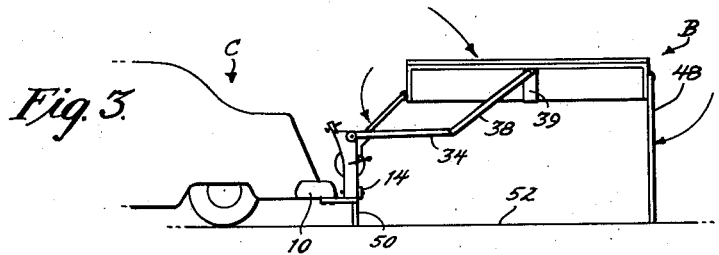
Figure 3 is a view similar to Fig. 2, representing the stage at which the supports for the canopy have been swung into usable position.
Figure 4:
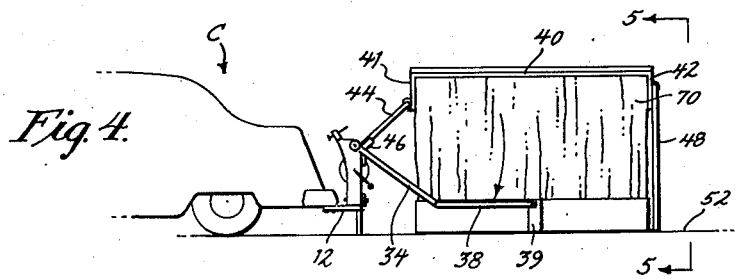
Figure 4 is still another view similar to Figures 2 and 3, showing the kit in its finally erected state.

Referring now to the drawing, wherein like reference characters denote corresponding parts, and first more particularly to Figures 1–4, inclusive, a conventional motor vehicle is therein illustrated and referred to in its entirety by the reference character C. The automobile C is typical of just about any motor vehicle, whether it be a sedan, hard top, or might even be a convertible with its top raised. In any case, the automobile C has a rear bumper 10 that is secured directly to the rear end of the car chassis and a top for the car body which is represented at 11.

An attachment is referred to in its entirety by the reference character A and is shown as secured to the chassis by being attached to the underside of the bumper 10. This attachment is illustrated in detail in Figures 7, 8, and 9.

The attachment A comprises a pair of longitudinal struts 12 that are secured to the underside of the bumper 10 in any preferred manner, such as by the bolts shown at 13. Upstanding from the rear end of each of the struts 12 are a pair of vertical flanges 13a. Secured to these flanges 13a is a crossbar 14, with the anchorage being effected by screw bolts 15. These screw bolts 15 obviously pass through aligned openings in the crossbar 14 and flanges 13a, respectively. In order to adapt the attachment to cars of different makes and dimensions, the crossbar 14 may be provided with a set or series of openings at each side so as to accommodate variations in the relative distance between the struts 12. Upstanding from the crossbar 14, to which their lower ends are connected, are a pair of side supports 16 and 17. The lower ends of the supports 16 and 17 are formed with a series of openings 18 certain ones of which align with openings in the crossbar 14. Screw bolts 19 pass through the aligned openings to effect the anchorage of the supports 16 and 17 to the crossbar. The purpose of the series of openings 18 is for adapting the attachment to cars of different makes and types which might require variations in the effective height of the supports 16 and 17.

As is more clearly shown in Figures 8 and 9, the upper end of each of the supports 16 and 17 is enlarged to provide a bearing opening at 20 (see Figure 7) and a side ear 21. Each of the side ears 21 is formed with a threaded opening which receives an adjustable abutment screw 22, for a purpose to be later described. Journaled in the bearing openings 20 is a cross shaft 23 on which is drivably mounted a gear 24. Meshing with this gear 24 is a pinion 25 carried by a shaft 26 that is included as a part of a gear-reduction unit 27 that is mounted on the support 17. Extending outwardly from the gear-reduction unit 27 is a crankshaft 28 that carries an operating handle 29. Obviously, this handle 29 may be availed of to rotate the cross shaft 23 through the medium of gear-reduction unit 27, pinion 25, and gear 24.

A counterbalancing spring 30 has one end anchored to a collar 31 which is drivably mounted on the shaft 23, and its other end is secured to the support 16 as illustrated at 32.

The cross shaft 23 projects beneath the supports 16 and 17 at each end; and drivably secured to these projecting portions are a pair of arms 33 and 34. It will be noted that each of these arms 33 and 34 is adapted to engage the end of one of the abutment screws 22 to limit swinging movement of the arms in a forward direction (speaking with reference to the car).

Referring now more particularly to Figure 10, the arms 33 and 34 are shown as carrying sleeves 35 at the ends remote from the shaft 23. These sleeves 35 receive a crosspiece 36 in a rigid non-rotative relation. Integrally connected to the outer ends of the crosspiece 36 are arm members 37 and 38, which are out of alignment with the arms 33 and 34 and disposed at an obtuse angle relative thereto. This angular relation between the arms 33 and 34 on the one hand and the arm members 37 and 38 on the other is fixed, and remains so during all phases of the operation. Suspended from the upper or outer ends of the arm members 37 and 38 is a U-shaped hanger 39 which receives the kit body that is shown in phantom outline in Figure 2 and referred to in its entirety by the reference character B. It is important to note that this kit body B is substantially suspended from the upper ends of the arm members 37 and 38.

A canopy is illustrated in Figures 1–4, inclusive, and in phantom outline in Figure 10. This canopy comprises a top wall 40, a front end wall 41, and a rear end wall 42. Mounted on the external face of the front end wall 41 and in spaced relation are a pair of brackets 43 in which is pivotally mounted a U-shaped member including supporting legs 44 and a back 45. When the kit is stored away in its nonusable condition, these legs 44 assume the position illustrated in Figure 1. However, when the kit is to be erected, the lower free ends of these legs 44 are received in sockets provided by socket members 46 that are attached to the rear edges of the supports 16 and 17 opposite to the ears 21, this position being clearly illustrated in Figure 4.

Another pair of brackets 47 are secured to the exterior face of the rear end wall 42 of the canopy, and pivotally mounted to these brackets 47 is a U-shaped member including legs 48 and a back 49. In the compact nonusable position, the supporting legs 48 assume the position illustrated in Figure 1 in which they encompass the sides of the kit body. However, when the kit is in its erected condition, these legs 48 assume the position shown in Figures 3 and 4.

Referring again more particularly to Figures 7 and 8, it will be noted that a pair of supporting legs 50 have their upper ends pivotally attached to the crossbar 14 as indicated at 51. During periods of transportation, the legs 50 are swung into an upraised position in which they align with the bar 14, and may be held in this position by any appropriate detent. When the kit is detached from the car, the legs 50 are swung downwardly so that their lower ends engage the ground surface depicted at 52. In this position the crossbar 14 is, of course, supported from the ground.

The kit body B includes a bottom 53 (see Figure 5) which engages the ground surface when the kit is erected. This bottom 53 is formed with narrow side flanges 54 which act as retainers for the lower ends of the legs 48 when the kit is erected. Thus, while the legs 48 in the position of Figure 3 engage the ground surface 52, after the bottom 53 reaches the ground the lower ends of the legs 48 may be moved over into position inside the flanges 54.

Carried by the bottom 53 and extending along each side thereof are chests 55 and 56 which provide storage space for any equipment desired and which, together with the bottom 53, define a well or recess 57.

Referring now more particularly to Figure 11, a bed assembly, indicated at 58, is pivotally mounted on the upper inside corner of the chest 56 as indicated at 59. Pivotally mounted at the corners remote from the pivotal connection 59 are a pair of supporting legs 60 which are adapted to assume the broken-line position shown in Figure 11 when the bed element 58 is swung outwardly. Also pivotally mounted on the bed element 58 at its upper inside corner adjacent the pivotal mounting 59 is a U-shaped frame, referred to in its entirety by the reference character U. This frame U comprises a back 61 having legs 62 formed with offset portions 63. It is the ends of these offset portions 63 that are connected to the bed element 58 as indicated at 64.

Another bed element 65 has one edge secured to a bracket in the form of an angle iron 66. This angle iron 66 is pivotally mounted on the inner side of the chest 55 as indicated at 67. The angle bracket 66, together with the bed element 65, is adapted to be swung over in the position depicted in broken lines in Figure 11. This bed element 65 carries a pair of swinging legs 68 that are comparable to the lges 60, and a U-shaped frame similar to the U-shaped frame U described in connection with the bed element 58. This frame U for the bed element 65 is pivotally connected thereto as indicated at 69.

Figure 5:
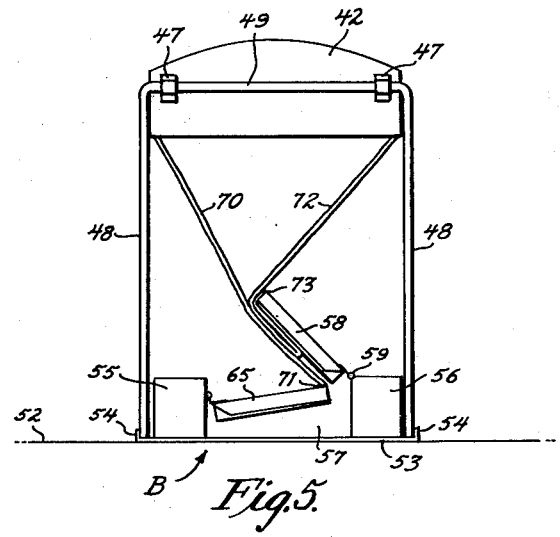
Figure 5 is an elevation looking from the rear end, showing the position of the bed elements and side flaps when the kit body first reaches the ground, as designed for two people.

It is intended that the canopy 40, 41, and 42 together with the kit body B, provide an enclosure in the nature of a tent for the sleeping quarters afforded by the bed elements 58 and 65. As illustrated in Figure 5, a side flap 70 has its upper edge secured to the canopy, and its lower edge is secured to a corner of the bed element 65 as indicated at 71. Another side flap 72 has its upper end edge secured to the canopy and its lower end edge to the bed element 58 as indicated at 73. When the kit is packed away, these flaps 70 and 72 assume a folded condition between the canopy and the kit body. However, after the kit body has been lowered and the bed elements 58 and 65 swung outwardly, and the U-shaped frames U moved into effective position, the flaps 70 and 72 assume the position depicted in Figure 6.

The tent enclosure may also include front end and rear end flaps (not illustrated), which would be erected in position in an obvious manner.

*Operation*

During periods when the kit is not to be used, the attachment A is, of course, removed from the car. When it is to be used, the attachment A is applied by connecting the struts 12 to the car chassis beneath the rear bumper as indicated at 13. With the kit in condition for transportation, the arms 33—37 and 34—38 are in the position of Figure 1. The kit body B is received within the canopy 40, 41, and 42; and he two may be temporarily bound together by appropriate bonding means. The unit comprising the canopy and kit body may be tied down to the roof 11 by any appropriate tie-down device, such as represented at 74. Moreover, the legs 50 are swung up into the broken-line position of Figure 7.

When an appropriate camp site is reached, the tie-down 74 is released and the temporary bonds between the canopy and kit body are broken. The operator now avails of the crank 20 so as to rotate the shaft 23 in a clockwise direction (speaking with reference to the showing of Figures 1, 2, 4, and 8 of the drawing). During the initial phase of this rotation, the canopy, together with the kit body, moves upwardly and rearwardly into the position of Figure 2. This operation is continued until the canopy reaches the height which it is to assume above the ground surface as determined by the length of the legs 48. These legs 48 are now swung downwardly into the position of Figure 3 and the legs 44 swung over into the position in which their free ends are received in the sockets provided by the members 46. It is obvious that, with the canopy supported at the front by the legs 44 and at the rear by the legs 48, it cannot be further lowered.

The operator continues to rotate the shaft 23 through the medium of the crank handle 29, and this continued rotation causes the arms 33—37 and 34—38 to move the kit body B downwardly until the bottom 53 thereof engages the ground surface. After this occurs, the lower ends of the legs 48 may be slightly raised and moved over the retaining flanges 54.

Figure 6:
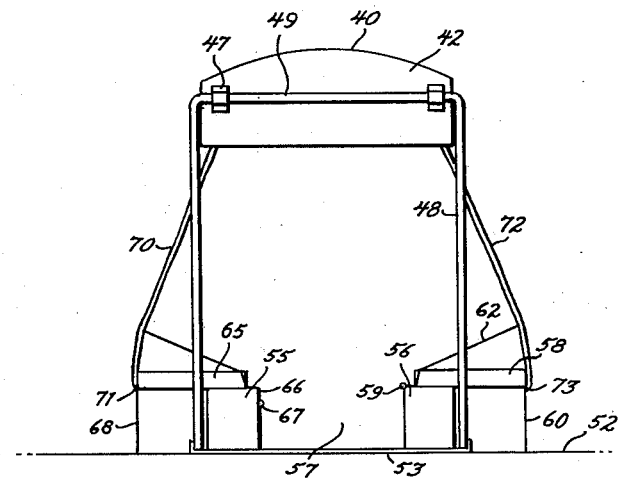
Figure 6 is a view similar to Figure 5, illustrating the bed elements as swung outwardly and the U-shaped frames in position distending the side flaps.

As the kit body moves downwardly and separates from the canopy the side flaps 70 and 72 unfold in the manner depicted in Figures 5 and 6.

The operator now first swings the bed element 58 outwardly into the broken-line position of Figure 11, at which time the supporting legs 60 are swung into effective position and the U-shaped frame U is swung on its pivot 64 so that the back 61 thereof engages the side flap 72 to distend the latter and provide adequate space above bed element 58. The second bed element 65 is then swung outwardly in a similar manner, and its legs 68 moved into effective position, as is the U-shaped frame associated therewith.

It is evident that the foregoing operations properly position the side flaps 70 and 72. The front and rear end flaps may then be erected in an obvious manner, and enclosed sleeping quarters are provided.

When the kit is to be packed, all that is required is the reverse of the above operations. Thus the U-shaped frames U are first swung down into effective engagement with the respective bed elements so as to retain the sheets or covers associated therewith in proper relation relative thereto. The bed elements 58 and 65 are then swung inwardly into the full-line position of Figure 11.

The operator now rotates the shaft 23 in a counterclockwise direction. The kit body is first returned to the position of Figure 3, whereupon the legs 44 and 48 are swung over into the positions depicted in Figures 1 and 2. Continued rotation returns the kit body and canopy as a unit to the position of Figure 1, whereupon it may be tied down, and any temporary bonds tying the two together as a unit applied. When the kit is detached from the car the legs 50 are swung down into supporting position.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In an automobile campers' kit, an attachment including support means for securement to the rear end of an automobile chassis, a cross shaft carried by said support means, means for rotating said shaft, a pair of spaced arms carried by said shaft at opposite ends thereof, a hanger suspended from said arms at the ends remote from said shaft, a kit body carried by said hanger, a canopy positioned over said kit body and separable therefrom, a pair of legs pivotally mounted at one end of said canopy and having free ends adapted to engage the ground, and a second pair of legs pivotally mounted at the other end of said canopy and having free ends adapted to supportingly engage said support means.

2. In an automobile campers' kit, an attachment including support means for securement to the rear end of an automobile chassis, a cross shaft on said support means, a pair of arms carried by said shaft at opposite ends thereof and each of which comprises angularly disposed sections, a U-shaped hanger carried by said arms at the free ends thereof, a kit body carried by said hanger, a canopy including front and rear end walls positioned over said kit body and separable therefrom, a pair of comparatively short legs pivotally mounted on said front end wall and having free ends adapted to be supported from said support means, and a pair of longer legs pivotally mounted on said rear end wall and having free ends adapted to supportingly engage the ground.

3. In an automobile campers' kit, an attachment including support means for securement to the rear end of an automobile chassis, a cross shaft carried by said support means, a pair of arms carried by said shaft at opposite ends thereof and each of which comprises angularly disposed sections, a U-shaped hanger carried by said arms at the free ends thereof, a kit body carried by said hanger, a canopy including front and rear end walls positioned over said kit body and separable therefrom, a pair of comparatively short legs pivotally mounted on said front end wall and having free ends adapted to be supported from said support means, a pair of longer legs pivotally mounted on said rear end wall and having free ends adapted to supportingly engage the ground, and a counterbalancing spring operatively associated with said shaft having one end anchored to said shaft and the other end to said support means.

4. In an automobile campers' kit, an attachment including support means for securement to the rear end of an automobile chassis, a cross shaft on said support means, a pair of arms carried by said shaft at opposite ends thereof and each of which comprises angularly disposed sections, a U-shaped hanger carried by said arms at the free ends thereof, a kit body carried by said hanger, a canopy including front and rear end walls positioned over said kit body and separable therefrom, a pair of comparatively short legs pivotally mounted on said front end wall and having free ends adapted to be supported from said support means, a pair of longer legs pivotally mounted on said rear end wall and having free ends adapted to supportingly engage the ground, a counterbalancing spring operatively associated with said shaft having one end anchored to said shaft and the other end to said support means, a gear drivably mounted on said shaft, a pinion meshing with said gear, and a gear-reduction unit operatively connected to said pinion and including a manually operable crankshaft.

5. In combination, an automobile including a chassis and a car body having a roof, an attachment secured to said chassis at the rear end thereof, said attachment including a cross shaft and manual means for rotating the same, a pair of arms carried by said shaft at the opposite ends thereof each of which includes angularly disposed sections, a kit body suspended between said arms from the free ends thereof, a canopy positioned over said kit body and separable therefrom, means for tying said kit body and canopy as a unit to said roof, and supporting legs carried by said canopy for maintaining said canopy in an upraised position relative to the ground as said kit body is separated therefrom by rotation of said shaft.

6. In an automobile campers' kit, a canopy comprising a top and front and rear end walls, a pair of short legs pivotally mounted on said front end wall, a pair of longer legs pivotally mounted on said rear end wall, a kit body enclosed by said canopy and separable therefrom, said kit body including a bottom wall and a pair of side members defining a well therebetween, a pair of bed elements pivotally mounted on said respective side members and adapted to assume a compact position in said well, each of said bed elements being adapted to be swung outwardly into a usable position, and a pair of side flaps each flap having an upper edge secured to said canopy and a lower edge secured to an edge of one of said bed elements.

7. In an automobile campers' kit, a canopy comprising a top and front and rear end walls, a pair of short legs pivotally mounted on said front end wall, a pair of longer legs pivotally mounted on said rear end wall, a kit body enclosed by said canopy and separable therefrom, said kit body including a bottom wall having side flanges and a pair of side members defining a well therebetween, a pair of bed elements pivotally mounted on said respective side members and adapted to assume a compact position in said well, each of said bed elements being adapted to be swung outwardly into a usable position, a pair of side flaps each flap having an upper edge secured to said canopy and a lower edge secured to an edge of one of said bed elements, and a U-shaped frame pivotally mounted on each bed element and adapted to assume a position distending the side flap associated with that bed element.

8. In an automobile campers' kit, a canopy comprising a top and front and rear end walls, a pair of short legs pivotally mounted on said front end wall, a pair of longer legs pivotally mounted on said rear end wall, a kit body enclosed by said canopy and separable therefrom, said kit body including a bottom wall having side flanges and a pair of side members defining a well therebetween, a pair of bed elements pivotally mounted on said respective side members and adapted to assume a compact position in said well, each of said bed elements being adapted to be swung outwardly into a usable position, a pair of side flaps each flap having an upper edge secured to said canopy and a lower edge secured to an edge of one of said bed elements, a U-shaped frame pivotally mounted on each bed element and adapted to assume a position distending the side flap associated with that bed element, and a pair of supporting legs pivotally mounted on each bed element at points remote from the pivotal mounting thereof and adapted to be swung down into ground-engaging supporting position.

9. In an automobile campers' kit, an attachment comprising a pair of spaced struts, means on said struts for securing the same to the rear end of an automobile chassis, a crossbar secured to said struts, a pair of side supports upstanding from said crossbar, a cross shaft pivotally mounted at the upper end of said side supports, a pair of arms carried by said cross shaft at the opposite ends thereof, a counterbalancing spring having one end anchored to said shaft and the other end to one of said supports, a gear drivably mounted on said shaft, a gear-reduction unit carried by one of said supports and including a pinion meshing with said gear and a manually operable crankshaft, each of said supports being formed with an outwardly extending ear, an adjustable abutment member in the form of a screw threadedly mounted in each of said ears and having a free end adapted to engage one of said arms, a kit body suspended between and from said arms at the free ends thereof, and a canopy positioned over said kit body and separable therefrom.

References Cited in the file of this patent

UNITED STATES PATENTS

| | | | |
|---|---|---|---|
| 893,491 | Hansen | July 14, | 1908 |
| 1,802,409 | Deutsher | Apr. 28, | 1931 |
| 2,071,644 | McBrady | Feb. 23, | 1937 |
| 2,204,432 | Morgadanes | June 11, | 1940 |
| 2,492,841 | Burkey | Dec. 27, | 1949 |
| 2,521,815 | Will | Sept. 12, | 1950 |
| 2,683,265 | Wayne | July 13, | 1954 |
| 2,800,264 | McFadyen | July 23, | 1957 |